F. L. KIDDER.
Ice-Velocipede.

No. 34,718. Patented Mar. 18, 1862.

Witnesses.
Lemuel W. Serrell
Thos. Geo. Harold.

Inventor.
F. L. Kidder.

UNITED STATES PATENT OFFICE.

FRANCIS L. KIDDER, OF BROOKLYN, NEW YORK, ASSIGNOR TO HIMSELF AND FREDERICK HOEFT, OF SAME PLACE.

IMPROVEMENT IN ICE-CARS.

Specification forming part of Letters Patent No. 34,718, dated March 18, 1862.

*To all whom it may concern:*

Be it known that I, FRANCIS L. KIDDER, of Brooklyn, E. D., in the county of Kings and State of New York, have invented, made, and applied to use a certain new and Improved Ice-Car; and I do hereby declare that the following is a full, clear, and exact description of the same, reference being had to the annexed drawings, making part of this specification, wherein—

Figure 1:
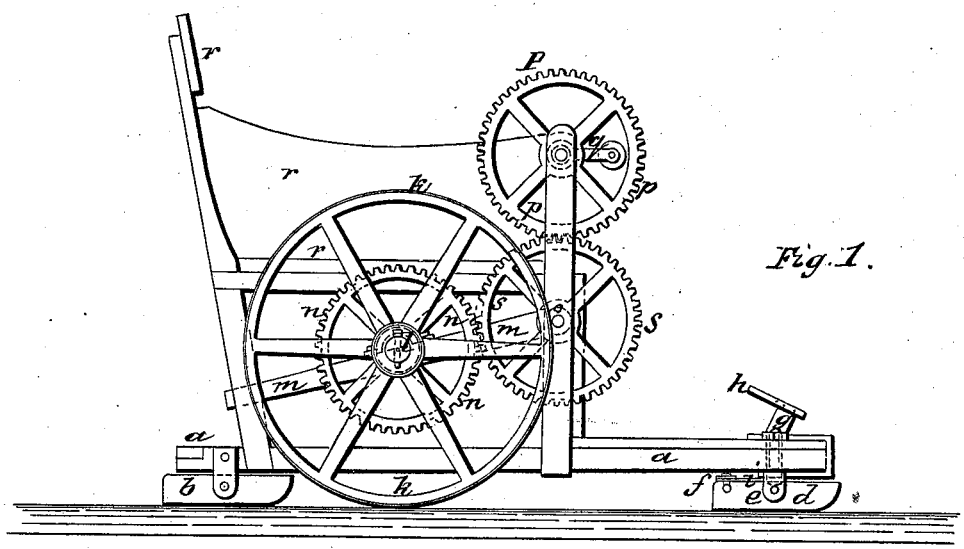
Figure 2:
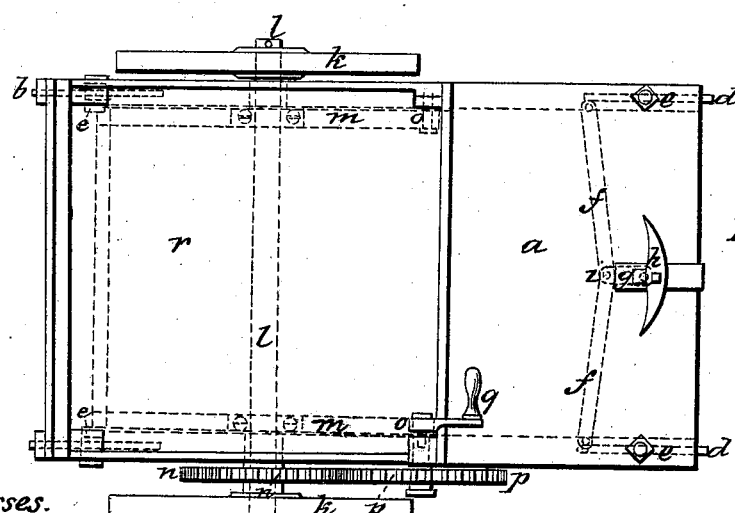

Figure 1 is a plan of my said ice-car, and Fig. 2 is a side elevation of the same.

Similar marks of reference indicate the same parts.

In traveling on the ice many persons speedily get tired of skating or are unable to engage therein, and the ice-boats heretofore employed are more or less dangerous, as being likely to throw the person out.

The nature of my said invention consists in a platform provided with skates or runners, in combination with a revolving wheel or wheels turned by a crank or otherwise, said wheel or wheels being so fitted as to press upon the ice with the necessary force to cause sufficient traction for the propulsion of the car thus formed. By this device the operator can either sit or stand and give propulsion to the car and himself with very considerable velocity, and the dangers attendant upon the use of ice-boats are avoided.

In the drawings, $a$ is a frame or platform of suitable size and shape.

$b$ $b$ are runners or skates attached by the joints $c$, so that they will conform to inequalities of the ice.

$d$ $d$ are the front runners or skates, similarly attached at $e$; but said joints can also turn at the points of connection with the platform $a$, so that the direction of the skates can be changed for steering the car. This is effected by a bar $f$, connecting the back ends of the skates and acted upon by an arm $i$ from the vertical bar $g$, provided with the cross-head $h$, by means of which the operator can steer with his feet.

The propulsion is effected by means of the wheels $k$ $k$ on the axle $l$, and $m$ is a frame attached at $o$, carrying the said wheels $k$ $k$ and axle $l$.

$s$ is a wheel centered at $o$ and gearing to the wheel $n$ on the axle $l$ and to a wheel $p$, that is provided with a crank-handle $q$.

$r$ is a seat that may be provided on the said car.

By turning the handle $q$ the car will be propelled through the agency of the wheels $k$ $k$, and these will always remain in contact with the ice, because the frame $m$ will rise and fall on $o$ by any inequalities and the gearing still remain in contact.

The wheels $k$ $k$ may be fitted with spikes or projections to increase their hold on the ice.

What I claim, and desire to secure by Letters Patent, is—

The platform $a$, provided with the skates or runners and steered substantially as set forth, in combination with the propelling wheel or wheels $k$, actuated substantially as specified, In witness whereof I have hereunto set my signature this 17th day of January, 1862.

F. L. KIDDER.

Witnesses:
LEMUEL W. SERRELL,
THOS. GEO. HAROLD.